May 18, 1926.

E. B. HOFF 1,585,349

WINDOW CLEANING DEVICE

Filed May 15, 1922

2 Sheets-Sheet 1

INVENTOR.
Earl B. Hoff
BY
Harold Elmo Smith
ATTORNEY.

May 18, 1926.

E. B. HOFF 1,585,349

WINDOW CLEANING DEVICE

Filed May 15, 1922   2 Sheets-Sheet 2

Inventor.
Earl B. Hoff
by Harold Elmo Smith Atty.

Patented May 18, 1926.

1,585,349

UNITED STATES PATENT OFFICE.

EARL B. HOFF, OF EAST CLEVELAND, OHIO, ASSIGNOR TO THE AZOR MOTOR MANUFACTURING COMPANY, OF CLEVELAND, OHIO, A CORPORATION OF OHIO.

WINDOW-CLEANING DEVICE.

Application filed May 15, 1922. Serial No. 561,129.

This invention relates to power driven apparatus for the cleaning of windows and has especial reference to that class of devices known as "windshield cleaners" as employed chiefly upon automobiles and trucks although equally applicable to windows of street cars, pilot houses, switch houses, sentry boxes, and look-out posts of every description.

When applied to automobile use the requirements are quite rigid, especially that the weight shall be as small as possible to the end that the windshield frame may not be overloaded or the glass broken despite the jouncing to which such a device is subjected; the device must operate with a minimum of power and with absolute reliability both on wet glass and dry glass; it must be compact so as neither to be unsightly nor to obstruct the vision; it must be so designed as to fit cars of all types; and in order to be successful commercially it must be so designed as to be cheaply manufactured else its market will be very small.

The main object of my invention is the provision of a mechanism which shall meet all the foregoing requirements and at the same time be reliable in use, easily installed, and easily lubricated; another object is the provision of a device of this character which can be operated slowly but without vibrating or chattering; while further objects and advantages of the invention will become apparent as the description proceeds.

Figure 1:
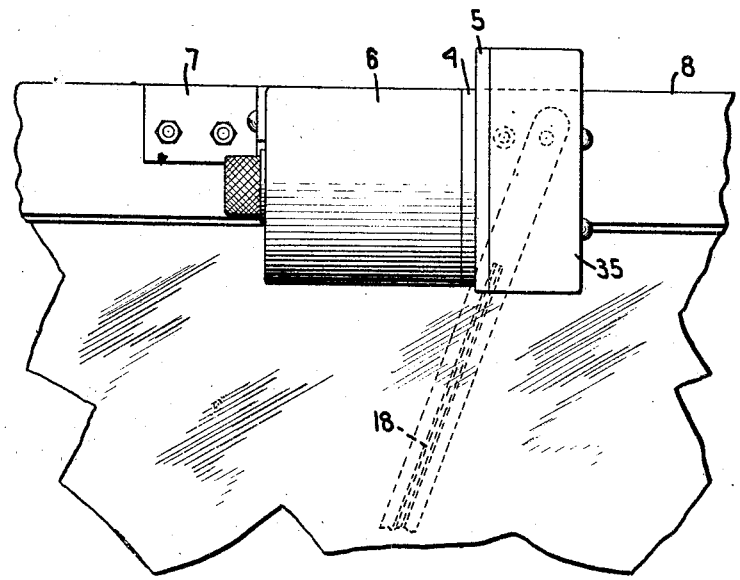
Figure 2:
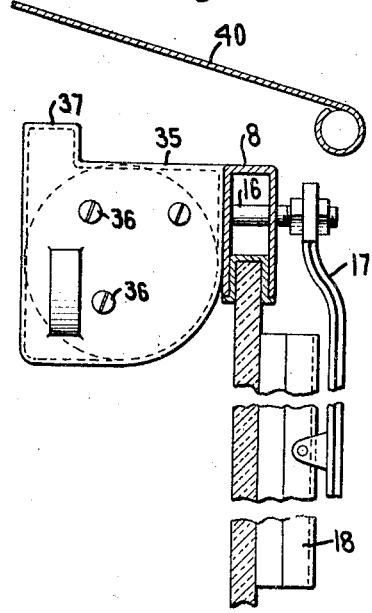
Figure 3:
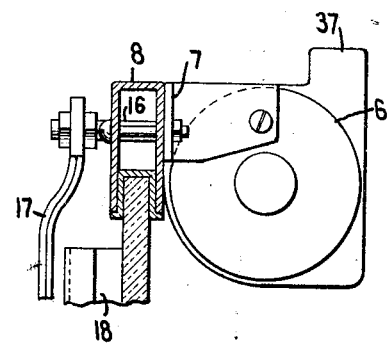
Figure 4:
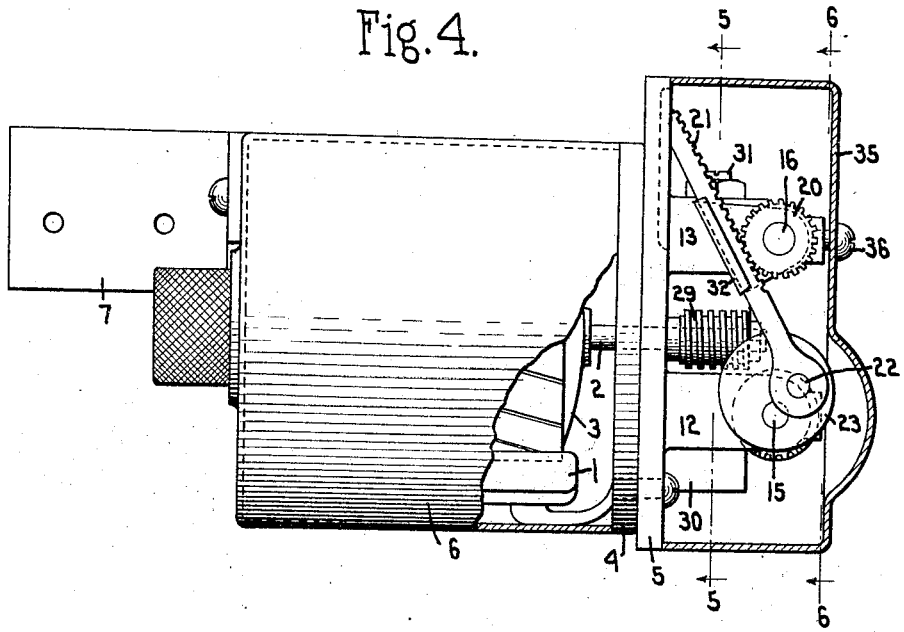
Figure 5:
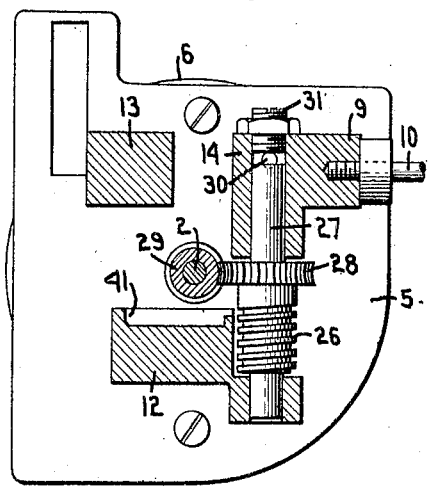
Figure 6:
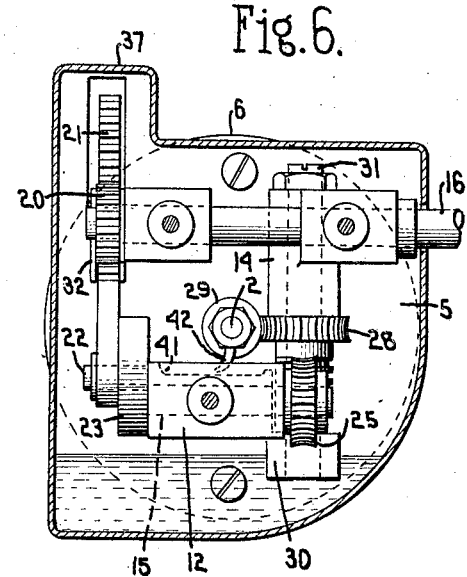
Figure 7:

In the drawings accompanying and forming a part of this application I have shown one physical structure in which my inventive idea can be embodied although it will be understood that these views are intended merely to be illustrative of the principles of my invention and not exhaustive on the application of these principles. Fig. 1 illustrates my device in place on an automobile windshield; Fig. 2 is a vertical sectional view of the windshield showing the right hand end of my cleaning device; Fig. 3 is a sectional view of the windshield showing the left hand end of said device; Fig. 4 is an enlarged front elevation of the cleaning device with the front of the gear casing broken away; Figs. 5 and 6 are sectional views corresponding to the lines 5—5 and 6—6 respectively of Fig. 4; and Fig. 7 is a cross sectional view of the preferred form of wiper arm.

Describing by reference characters the parts shown in these drawings 1 represents the frame, 2 the shaft, and 3 the armature of an electric motor, one end of the frame being provided with a ring 4 to which is bolted the base plate 5 of the gearing. The works of the motor are covered by a suitable shell 6, and its exterior is formed at one end with the apertured bracket 7 adapted for attachment to the frame 8 of a windshield or other glass which is to be kept free from water, snow, or other accumulation. The plate 5 is also preferably formed with a suitable projection 9 adapted for the reception of a screw 10 also assisting in the attachment of the device.

Projecting from the outer face of the plate 5 are a plurality of integral bosses 12, 13, 14, the first mentioned boss being located beneath the shaft 2 and the last mentioned above the same. In the present embodiment the boss 14 is shown as integral with the boss 9 and spaced from the boss 13 but this is a matter of choice. Journaled in the boss 12 is a horizontal lay shaft 15 perpendicular to the shaft 2, and journaled in the bosses 13 and 14 parallel to said lay shaft is a rock shaft 16 whose end passes through the windshield frame and is there rigidly secured to a stiff and non-vibratory arm 17 which carries the rubber squeegee 18. Rigidly secured to the opposite end of the shaft 16 is a pinion 20 which meshes with a generally upright rack 21 whose lower end is pivoted at 22 to a crank 23 carried by the corresponding end of the shaft 15. The opposite end of the shaft 15 is provided with a worm gear 25 meshing with a vertical worm 26 carried by a vertical shaft 27 which also carries a worm gear 28 meshing with a second worm 29 carried by the shaft 2. In the present embodiment the thrust of the worm 26 is upward and is resisted by a thrust bearing 30 seated against a screw plug 31. The rack 21 is held against its pinion 20 by means of a suitable stirrup 32 pivoted to the shaft 16. All the gearing is housed in by an oil tight metal cover 35 which may conveniently be fastened to the different bosses by screws 36 and is preferably confined almost entirely within the limits of height and breadth of the motor shell although I have shown an upward extension at 37 for the reception of the end of the rack, this extension being located at such a distance from the windshield as to be out of conflict with the top cover 40 of any standard make of car.

By this construction the maximum simplicity and compactness of the gearing is secured; if each worm gear contains 20 teeth the entire reduction of speed is at the ratio of 400 to 1. The location of all the gearing in integral bosses formed on one side of a single plate enables all the machining to be effected with one chucking, and by the use of high speed machinery; and the employment of an irreversible drive of high mechanical advantage enables the employment of a particularly small and light motor, while chattering and vibration of the squeegee is avoided by the use of an arm of such a degree of rigidity as to prevent unequal movements of the same.

It is well known that any soft substance like rubber when applied to a hard and smooth surface like glass tends to adhere thereto, and it can be demonstrated that if an attempt is made to draw a squeegee of such substance thereover by a yielding or elastic arm the progress becomes one of alternate waits and jumps. The explanation is that the squeegee instead of starting with the arm, lags behind until sufficient stress is set up by a deflection of the arm to overcome the adhesion or static friction. It now jumps ahead, the moving friction is much less than the static friction, and the inertia of the arm and squeegee carries the latter too far forward, whereupon it pauses, static friction is again exhibited and the process is repeated. Using a light arm it is possible to secure uniform movement only by a rapid oscillation, say sixty or more swings per minute, but this is unduly wasteful of power, is hard on the glass, and tends to confuse the observer. I have found that by the use of a rigid arm I can reduce the number of strokes per minute as much as I please without chattering. Ordinarily a positive and irreversible drive such as I have shown is especially subject to this fault, but I find that by using an arm whose natural vibration period is high and whose coefficient of rigidity is much higher than the coefficient of adhesion between the squeegee and the glass, the chattering is overcome at all speeds.

The pinion 20, crank 23, and gear 25 are most conveniently affixed to their respective shafts by first knurling the latter and afterwards forcing the former in place by a suitable press. In order to lubricate the device to greatest possible advantage I preferably employ the bottom of the housing for an oil well as shown in Fig. 6 into which the crank 23 may dip. At each revolution a portion of the oil carried upward by this crank overflows on to the top of the boss 12 which is hollowed out to form a cup 41 for its reception, and the end of the shaft 2 is then formed with a spoon 42 adapted to dip into the cup at each rotation and throw oil upon all other moving parts inside the casing.

It will be understood that changes can be made in features of detail without departing from the scope of my invention, and that I do not restrict my device for use with automobiles, but have merely described it in this connection as exhibiting a particularly rigid set of conditions.

What I claim is:

1. In apparatus, an electric motor, a base plate through which the motor shaft projects having bearing bosses on the side opposite the armature, a pair of parallel shafts journaled in said bosses parallel to the plate, one at each side of the armature shaft, an arm and a pinion secured to one of said shafts, a worm gear and a crank secured to the other of said shafts, a rack articulated to said crank and meshing with said pinion, a worm journaled in said plate in a vertical position upon the opposite side of the armature shaft from said rack and meshing with said worm gear, a second worm gear rotatable with said worm, and a second worm carried by the armature shaft and meshing with said second worm gear.

2. In apparatus, in combination, a supporting plate, a pair of parallel shafts carried by said plate parallel to the plane of the plate, a crank and worm gear carried by one shaft, an arm and a pinion carried by the other shaft, a rack connecting said crank and pinion, a worm journaled on a vertical axis and meshing with said worm gear, and a drive shaft projecting through said plate and operatively connected to said worm.

3. In apparatus, in combination, an electric motor, a base plate secured to one end thereof, and apertured for the passage of the motor shaft, means for securing said motor to a vertical frame with said shaft horizontal, a boss carried by said plate below the projecting end of said shaft and having a recess in its upper face, a horizontal lay shaft journaled in said boss perpendicular to the motor shaft, a rock shaft journaled in said plate above said motor shaft and parallel to said lay shaft, operating connections between said lay shaft and rock shaft, driving connections between said motor shaft and lay shaft, an oil tight housing secured to said plate and covering said shafts, the lowest part of said housing constituting an oil well, one of the members of said lay shaft being arranged to dip therein and convey oil to said recess, and a spoon carried by the motor shaft adapted to dip into said recess.

In testimony whereof, I hereunto affix my signature.

EARL B. HOFF.